(12) United States Patent
Nakanishi

(10) Patent No.: US 7,584,596 B2
(45) Date of Patent: Sep. 8, 2009

(54) METHOD OF MANUFACTURING LINE OF AUTOHESION THREAD

(75) Inventor: Shigeru Nakanishi, Minamiawaji (JP)

(73) Assignee: Yoz-Ami Corporation, Hyogo (JP)

( * ) Notice: Subject to any disclaimer, the term of this patent is extended or adjusted under 35 U.S.C. 154(b) by 0 days.

(21) Appl. No.: 11/331,142

(22) Filed: Jan. 13, 2006

(65) Prior Publication Data

US 2006/0174536 A1 Aug. 10, 2006

(51) Int. Cl.
*D02G 3/22* (2006.01)
(52) U.S. Cl. .............. 57/243; 57/282; 57/310
(58) Field of Classification Search ........... 57/243, 57/250, 282, 310
See application file for complete search history.

(56) References Cited

U.S. PATENT DOCUMENTS

| | | | | | |
|---|---|---|---|---|---|
| 4,086,751 | A | * | 5/1978 | Hino et al. | 57/288 |
| 4,296,597 | A | * | 10/1981 | Tani et al. | 57/205 |
| 4,485,063 | A | * | 11/1984 | Good | 264/235.6 |
| 4,539,805 | A | * | 9/1985 | Ukai et al. | 57/290 |
| 5,540,990 | A | * | 7/1996 | Cook | 428/364 |
| 7,043,804 | B1 | * | 5/2006 | Goineau et al. | 28/240 |
| 2002/0130433 | A1 | * | 9/2002 | Hwo et al. | 264/103 |
| 2003/0082381 | A1 | * | 5/2003 | Nakanishi | 428/375 |
| 2004/0151904 | A1 | * | 8/2004 | Ding et al. | 428/373 |

FOREIGN PATENT DOCUMENTS

| | | | |
|---|---|---|---|
| JP | 54125724 A | * | 9/1979 |
| JP | 2005-76149 | | 3/2005 |

* cited by examiner

*Primary Examiner*—Shaun R Hurley
(74) *Attorney, Agent, or Firm*—Wenderoth, Lind & Ponack, LLP.

(57) ABSTRACT

A method of manufacturing autohesion thread such that a smooth surface is offered, the cutting thereof is easy, filaments composing thread are not frayed in cutting, drainability is superior, and plural kinds of filaments can be combined. A method of manufacturing a line of fusion thread, wherein plural filaments comprising thermoplastic resin are paralleled, twisted and/or braided if desired, subsequently drawn under heat at a draw ratio of less than 1.0 to thereby substantially fuse the adjacent filaments, and thereafter drawn under heat at a draw ratio of more than 1.0.

6 Claims, No Drawings

METHOD OF MANUFACTURING LINE OF AUTOHESION THREAD

BACKGROUND OF THE INVENTION

1. Field of the Invention

The present invention relates to a method of manufacturing a line of autohesion thread in which adjacent filaments are substantially fused together.

2. Background of the Invention

Fishing lines for leisure and fishery, materials for fisheries such as a longline of tuna fishery, and threads to be employed for rope, gut or kite string are roughly divided mainly into monofilament yarn and braided yarn such that plural monofilaments are braided.

Monofilament yarn has low frictional resistance in rubbing against other matters because it has a smoother surface than braided yarn. For example, when using monofilament yarn as a fishing line, the frictional resistance caused by the rubbing of the fishing line and the guide in throwing in the fishing line is so low that bait can be thrown exactly to a long distance. Monofilament yarn is also superior in drainability because it holds no water inside. In addition, braided yarn is cut with difficulty, and when the yarn is cut, the yarn in the cut portion is split and the cut portion becomes feathery, so that the handling is difficult. Monofilament yarn also has an advantage in that it has no such problem. However, for example, in the case where resin composing the yarn is ultra high molecular weight polyethylene or fully aromatic polyamide, it is necessary to use a solvent in spinning, and to remove the solvent after spinning. This is a problem that it is difficult to manufacture a monofilament having a certain thickness or more, which is appropriate for uses such as a fishing line, rope or gut as described above.

On the other hand, braided yarn can be made into a line of thread having a thickness appropriate for uses as described above, irrespective of the kind of resin as a raw material, by reason of employing plural monofilaments or a multifilament. In addition, braided yarn has such an advantage that it is possible to combine plural kinds of filaments. As a result, an effect such as adjustment of desired specific gravity, which is not obtained in a single filament, can be attained. In monofilament yarn, it is naturally impossible to combine plural kinds of filaments.

JP-A-9-98698 reports a method of manufacturing a fishing line in such a manner that plural filaments of polyolefin are braided or twisted, and thereafter exposed to a temperature in the melting range of polyolefin while drawn at a draw ratio of 1.0 or more to thereby fuse adjacent filaments. The inventors of the present invention, however, have found out that it is practically difficult to substantially fuse adjacent filaments in the above-mentioned fishing line by such a method. Accordingly, the application of physical force by use to the fishing line thus manufactured disjoints the bond of fiber by reason of not being actually substantially fused, so that it is incapable of achieving the original object of making a pseudo monofilament by fusing. The problem is that the application of physical force by use causes the fishing line to have no differences with ordinary braided yarn. Further, the inventors of the present invention have found a defect such that heat treatment in such a method decreases the strength of the fishing line, which thus cannot but be drawn in order to compensate for the decreased strength. Consequently, the drawing compensates for the strength, while the fishing line becomes greatly thinner to the extent of the thickness of approximately 60% or less compared to the thickness of the fishing line before the treatment, thereby deteriorating wear resistance.

The inventors of the present invention have earnestly studied a yarn having the above-mentioned advantages of both monofilament yarn and braided yarn to develop a line of thread in which plural filament yarn of high strength fiber are integrated by using low-temperature thermal adhesion resin having a lower melting point than the melting point of the above-mentioned filament yarn (JP-A-2002-54041). As a result of extensive studies, they have also developed a line of thread in which low-temperature thermal adhesion resin is replaced with a hot melt adhesive (JP-A-2003-116431).

BRIEF SUMMARY OF THE INVENTION

The present invention is intended to provide a method of manufacturing a line of fusion thread having the advantages of both monofilament yarn and braided yarn, such that a smooth surface is offered, the cutting thereof is easy, the filaments composed of the line of thread are not frayed in cutting, and the drainability and durability are superior, such that the application of physical force by use does not disjoint the bond of fiber. Further, more than one kind of filament can be combined.

Through intensive studies for achieving the above-mentioned objectives, the inventors of the present invention have unexpectedly found that plural filaments comprising a thermoplastic resin, which are paralleled, twisted and/or braided if desired, and subsequently drawn under heat at a draw ratio of less than 1.0, thereby substantially fuse the adjacent filaments completely without a fusing medium. The inventors of the present invention have found that drawing under heat at a draw ratio of less than 1.0 allows a line of fusion thread obtained by hot drawing treatment to become thicker as compared with the line before the treatment, thus solving the above-mentioned problems in the publicly known art. Substantially complete fusing of adjacent filaments in this manner allows a new line of thread having the following advantages not found in monofilament yarn or braided yarn. That is to say, a line of fusion thread of the present invention has a smooth surface and is also superior in drainability because it holds no water inside. In addition, the above-mentioned line of thread is easily cut and component filaments are not frayed by cutting or by long-term use. Thus, a resin composed of a filament is not limited to a single kind while having the advantage of monofilament yarn, and a combination of filaments of two different kinds or more may possess the characteristics of each of the filaments. The most preferable resin to be used is a high strength filament such as an ultra high molecular weight polyethylene filament.

The inventors of the present invention have completed the present invention through further studies.

DETAILED DESCRIPTION OF THE INVENTION

That is to say, the present invention relates to:

(1) a method of manufacturing a line of fusion thread wherein plural filaments comprising a thermoplastic resin are paralleled, twisted and/or braided if desired, subsequently drawn under heat at a draw ratio of less than 1.0 to substantially fuse the adjacent filaments, and thereafter drawn under heat at a draw ratio of more than 1.0, (2) the method of manufacturing a line of fusion thread according to the above (1), wherein the thermoplastic resin is a polyamide resin, a polyester resin, a fluororesin or a polyolefin resin, (3) the method of manufacturing a line of fusion thread according to the above (1), wherein the filaments comprising a thermoplastic resin are filaments having a tensile strength of 20 g/d or more, (4) the method of manufacturing a line of fusion thread according to any one of the above (1) to (3), wherein the temperature for the drawing under heat at a draw ratio of less than 1.0 is higher than the melting point of the filaments comprising a thermoplastic resin, (5) the method of manufacturing a line of fusion thread according to any one of the above (1) to (4), wherein the outer periphery of the thread is further coated with a synthetic resin after the heat drawing at a draw ratio of more than 1.0, (6) a method of manufacturing a line of fusion thread wherein plural filaments comprising a thermoplastic resin are paralleled so as to surround a core string and further twisted if desired, or plural filaments comprising a thermoplastic resin are braided around a core string, and subsequently drawn under heat at a draw ratio of less than 1.0 to thereby substantially fuse the adjacent filaments to be subsequently drawn under heat at a draw ratio of more than 1.0 if desired, (7) a method of substantially fusing adjacent filaments wherein the plural filaments comprising a thermoplastic resin are paralleled, twisted and/or braided if desired, and subsequently drawn under heat at a draw ratio of less than 1.0, (8) a line of fusion thread manufactured by a method according to any one of the above (1) to (7), (9) a line of fusion thread containing plural filaments comprising a thermoplastic resin and not containing a fusing medium, wherein the adjacent filaments are substantially fused together, and

(10) the line of fusion thread according to the above (9), containing plural filaments comprising a thermoplastic resin wherein the adjacent filaments are substantially fused, wherein the thickness of said line of thread is within a ±10% range of that of a line of thread containing filaments of the same thermoplastic resin wherein the number of the filaments is the same as said line of thread and the adjacent filaments are not fused; and that the tensile strength of said line of thread is more than that of the line of unfused thread. As clarified from the above, in a line of thread of the present invention, filaments composing the line of thread are fused together. However, an adhesive for fusing the filaments and a fusing medium such as low-melting fusion thread described in JP-A-2003-116431 are not used. A manufacturing method of the present invention is characterized by performing hot drawing at a draw ratio of less than 1.0, and thereafter further hot drawing at a draw ratio of more than 1.0.

A line of autohesion thread while composed of plural filaments of the present invention has a smoother surface than a conventional line of thread comprising braided yarn. Therefore, frictional resistance in rubbing against other matters is decreased to improve durability. For example, when a line of autohesion thread of the present invention is used as a fishing line, frictional resistance between a fishing line and a guide is so low that bait can be thrown exactly to a long distance. In addition, reeling operation is so easily performed as to scarcely twine and tangle.

A line of autohesion thread of the present invention scarcely holds water therein and is superior in drainability because adjacent filaments are substantially fused completely. Thus, particularly, a line of autohesion thread of the present invention can appropriately be used as fishing lines for leisure and fishery, and materials for fisheries.

Further, a line of autohesion thread of the present invention is easily cut and component filaments are not frayed after being cut, that is, a cut portion does not become feathery, whereby the handling in tying thread is favorable.

In addition, in a line of autohesion thread of the present invention, an effect which is not obtained in a single filament, such as adjustment of optional specific gravity, can be fulfilled by using plural kinds of filaments and inserting a core string into the center of a line of thread. Alternatively, the initial strength can be maintained even though single yarn denier is not thinned, so that a line of thread superior in wear resistance can be manufactured.

DETAILED DESCRIPTION OF PREFERRED EXAMPLES

The present invention relates to a method of manufacturing a line of autohesion thread, wherein plural filaments comprising a thermoplastic resin are paralleled, twisted and/or braided if desired, and subsequently drawn under heat at a draw ratio of less than 1.0 to thereby substantially completely fuse the adjacent filaments to be subsequently drawn under heat at a draw ratio of more than 1.0. More particularly, the present invention is characterized in that, for example, (a) plural filaments of thermoplastic resin are paralleled, (b) plural filaments of thermoplastic resin are paralleled and further twisted, (c) plural filaments of thermoplastic resin are paralleled and braided, or (d) plural filaments of thermoplastic resin are paralleled, twisted and subsequently braided, and thereafter subjected to drawing under heat at a draw ratio of less than 1.0 and further drawing under heat at a draw ratio of more than 1.0.

A filament comprising a thermoplastic resin to be employed in a manufacturing method of the present invention is herein after described.

Examples of the thermoplastic resin to be employed in a manufacturing method of the present invention include polyamide resins, polyester resins, fluororesins and polyolefin resins.

Specific examples of the polyamide resin are aliphatic polyamides such as nylon 6, nylon 66, nylon 12 and nylon 6,10, and a copolymer thereof, or semi-aromatic polyamides formed by aromatic diamine and dicarboxylic acid, or a copolymer thereof.

Specific examples of the polyester resin are polyesters or a copolymer thereof polycondensed from aromatic dicarboxylic acids (e.g. terephthalic acid, isophthalic acid, naphthalene-2,6-dicarboxylic acid, phthalic acid, $\alpha,\beta$-(4-carboxyphenyl) ethane, 4,4'-dicarboxyphenyl, 5-sodium sulfoisophthalic acid, etc.), aliphaticdicarboxylicacids (e.g. adipic acid, sebacic acid, etc.), or esters thereof, and diol compounds (e.g. ethylene glycol, diethylene glycol, 1,4-butanediol, polyethylene glycol, tetramethylene glycol, etc.).

Specific examples of the fluororesin are polyvinylidene fluoride, polytetrafluoroethylene, polymonochlorotrifluoroethylene or polyhexafluoropropylene, or a copolymer thereof.

Specific examples of the polyolefin resin are polyethylene or polypropylene.

A filament comprising a thermoplastic resin to be employed in the present invention is preferably a high-strength filament having a tensile strength of approximately 20 g/d or more, preferably approximately 25 to 50 g/d, more preferably approximately 30 to 40 g/d. Here, "tensile strength" can easily be measured, for example, in a manner according to JIS L 1013 "Testing methods for man-made filament yarns" by a tensile tester such as the universal tester AUTOGRAPH AG-100kN1 (trade name, manufactured by Shimadzu Corporation).

The filament comprising a thermoplastic resin is preferably a high-strength filament.

Specific examples of the above-mentioned high-strength filament include an ultra high molecular weight polyethylene filament, a fully aromatic polyamide filament, a heterocyclic high-performance filament, and a fully aromatic polyester filament. Among them, an ultra high molecular weight polyethylene filament comprising a flexible polymer is preferable.

The above-mentioned ultra high molecular weight polyethylene filament signifies a filament comprising ultra high molecular weight polyethylene. Here, ultra high molecular weight polyethylene has a molecular weight of approximately 200,000 or more, preferably approximately 600,000 or more, and includes a homopolymer of ethylene and also a copolymer of ethylene and lower α-olefins of about 3 to 10 carbon atoms such as propylene, butene, pentene and hexene. In the case of a copolymer of ethylene and α-olefin, preferred is a copolymer wherein the proportion of the α-olefin is approximately 0.1 to 20 on average, preferably approximately 0.5 to 10 on average with respect to 1000 carbon atoms in the polyethylene chain.

A method of manufacturing the ultra high molecular weight polyethylene filament is disclosed, for example, in JP-A-55-5228 and JP-A-55-107506, and these publicly known methods may be employed. Commercial products such as DYNEEMA (registered trademark) (tradename, manufactured by Toyobo. Co., Ltd.) and SPECTRA (trade name, manufactured by Honeywell International Inc.) may be used as the ultra high molecular weight polyethylene filament.

A filament as a raw material for a line of autohesion thread of the present invention may take any of the following forms: a multifilament made of plural filaments, a monofilament made of one filament and a monomultifilament such that a plurality of the above-mentioned monofilaments are doubled. A line of autohesion thread of the present invention may be composed of a form of only one filament or a mixed form of plural filaments among a multifilament, a monofilament and a monomultifilament. A filament to be used in the present invention may be a filament such that a cross section thereof is perfectly circular or flat. A filament to be used in the present invention may have a hollow structure.

A filament to be used in the present invention may contain various publicly known additives within a range of not deteriorating the object of the invention. Examples of such additives include a pigment, a coloring matter, a stabilizer, a plasticizer or a lubricant to be detailed below, which may be used in a combination of two or more additives. Examples of the additives also include a magnetic material, a conductive material and a material having a high dielectric constant. Specific examples of the above-mentioned materials include calcium carbonate, barium carbonate, magnesium carbonate, clay, talc, mica, feldspar, bentonite, aluminum oxide, magnesium oxide, titanium dioxide, silica and gypsum. These materials may be coated with stearic acid, acrylic acid or the like. A multi-, a mono- or a monomulti-filament to be used in the present invention may be colored with a solution or dispersion containing a coloring matter or a pigment.

A filament to be used in the present invention may contain metallic particles in order to adjust specific gravity and sedimentation velocity. Examples of a raw material composing metallic particles include iron, copper, zinc, tin, nickel or tungsten, which may be used singly, or in a mixture or an alloy of two or more of metallic raw materials. Among them, tungsten particles are preferably used. The reason therefore is that tungsten is so high in its specific gravity as to easily allow weight to a line of thread, and therefore addition in a small quantity thereof increases specific gravity while minimizing decreases in strength. These metallic particles can be applied to the present invention irrespective of the form of powder or granules. The average particle diameter thereof is appropriately approximately 20 μm or less, preferably approximately 10 μm or less. The above-mentioned range is preferable for the reason that too large particle diameter of metallic particles deteriorates general uniformity after mixing. In addition, the added quantity of metallic particles is preferably approximately 1 to 90 parts by weight, more preferably approximately 5 to 70 parts by weight with respect to 100 parts by weight of the resin.

Thermoplastic resin containing a metal is produced by melt-kneading metallic particles, for example, with the use of a uniaxial or biaxial kneader, and a filament containing the above-mentioned metallic particles can be manufactured from the resin by using a widely performed melt spinning method.

In the present invention, only a filament comprising one kind of thermoplastic resin may be used, or a combination of filaments comprising plural kinds of thermoplastic resins may be used. Preferable examples of an embodiment include a line of autohesion thread made of only a filament comprising one kind of thermoplastic resin. With regard to the present invention, in the case of using a combination of filaments comprising plural kinds of thermoplastic resins, a combination of filaments comprising thermoplastic resins having melting ranges close to each other is preferably used; more specifically, a combination of DYNEEMA (registered trademark) and a filament comprising polyethylene or polypropylene is preferably used.

Each process in the manufacturing method of the present invention is herein after described.

In the present invention, the above-mentioned plural filaments comprising a thermoplastic resin are paralleled, and twisted and/or braided if desired.

In paralleling plural filaments, the filaments may be paralleled so as to center a core string and surround it if desired.

A method of twisting plural filaments is not particularly limited, and twisting can be performed by using publicly known twisters such as a ring twister, a double twister or an Italian twister. The degree of twisting in the present process is not particularly limited, and twisting is preferably performed so that twist constant K is approximately 0.2 to 1.5, more preferably approximately 0.3 to 1.2, furthermore preferably approximately 0.4 to 0.8. Twist constant K is calculated by the following equation: $K = t \times D^{1/2}$ [in which t denotes number of twist (time/m) and D denotes degree of fineness (tex)]. Degree of fineness in the above-mentioned equation is measured in accordance with JIS L 1013 (1999).

A method of braiding plural filaments is not particularly limited, and braiding is ordinarily performed by using a braider (a braiding machine). For example, four filaments are prepared, and then a right-hand or left-hand filament are alternately placed in the middle and braided up. The number of filaments to be used for braiding is not limited to four, but occasionally eight, twelve or sixteen. Filaments to be used for braiding may previously be twisted. In addition, a core string as described above is centered, around which plural filaments can be braided.

Subsequently, the obtained paralleled yarn, twisted yarn or braided yarn is drawn under heat at a draw ratio of less than approximately 1.0.

A method of drawing treatment can adopt a publicly known method such as drawing while heating in the air. Drawing may be performed in one stage or two stages or more. The temperature in drawing can not unconditionally be determined, since it varies depending on the kind or diameter of a filament, or draw speed, for example, it is ordinarily a temperature of the melting point of a filament—approximately 10° C. or more. The upper limit of temperature in drawing is not particularly limited. More specifically, in the case where a filament is an ultra high molecular weight polyethylene filament, the temperature in drawing is approximately 150° C. or more (preferably approximately 150 to 170° C.).

The process of drawing is characterized by being performed at a draw ratio of less than approximately 1.0. This process allows plural filaments to be substantially fused together. Relaxation of a line of thread under heating in this manner allows adjacent filaments to be substantially fused together without a fusing medium. Here, "adjacent filaments are substantially fused" means that component filaments are not disentangled and frayed even though a line of autohesion thread manufactured in the present invention is cut in an optional place and then a cut portion is rubbed by hand. A fusing medium means a substance for promoting or assisting fusion, for example, including thermal adhesion resin, an adhesive, a mineral oil (such as heat-transfer grade mineral oil having an average molecular weight of 250 to 700), a paraffin oil and a vegetable oil (such as coconut oil). Such fusing medium is not necessary, needless to say, for manufacturing a line of autohesion thread to be manufactured in the present invention, and not necessary, for manufacturing other products such as a composite and fabric by using a line of autohesion thread to be manufactured in the present invention. However, such a medium may be used if desired.

Subsequently, the line of thread obtained in the previous process (drawing under heat at a draw ratio of less than 1.0) is drawn under heating at a draw ratio of more than approximately 1.0. In the case where a line of thread which is difficult to draw is used for the core string, such as metal wire or inorganic fiber, it is preferable not to perform the present process, and in the case where a line of autohesion thread to be manufactured by a method of the present invention is composed of only a filament comprising a thermoplastic resin, it is preferable to perform the present process.

A method of drawing treatment can adopt a publicly known method such as drawing while heating in liquid or gas. Drawing may be performed in one stage or two stages or more. The drawing treatment is characterized by being performed at a draw ratio of more than approximately 1.0. The draw ratio for the drawing treatment may be properly selected in accordance with the conditions such as the kind of filament to be used, whether or not drawing treatment has been performed for the filament as a raw material, or at what draw ratio the drawing was performed in the case where drawing treatment has been already performed. In the case where a filament, such as a commercial filament, drawn already at a draw ratio of more than 1.0 is used as a raw material in the previous process, a draw ratio in the present process (drawing under heating at a draw ratio of more than 1.0) is usually approximately 1.01 to 5, preferably approximately 1.01 to 3, more preferably approximately 2.2 to 3. Meanwhile, in the case of using an undrawn filament in the previous process, a draw ratio in the present process is usually approximately 1.01 to 15, preferably approximately 2 to 10, more preferably approximately 4 to 8. Here, "an undrawn filament" means a filament not drawn at all in manufacturing processes or a filament drawn at a draw ratio less than a draw ratio of a commercial filament in manufacturing.

In the present invention, a taper shape can be formed in drawing in the following manner. Specifically, a taper shape can be formed in drawing by adjusting the draw speed. More specifically, a taper shape can be formed by taking an advantage such that an increase in draw speed decreases diameter in a longitudinal direction and a decrease in draw speed increases diameter in a longitudinal direction. In changing draw speed as described above, it is preferable that change in draw speed is gently inclined toward increase or decrease.

That is, draw speed is preferably increased or/and decreased gradually in drawing. If change in draw speed is such gentle change, draw speed may be linearly changed or not. Draw speed in drawing can not unconditionally be determined, since it varies depending on the kind or diameter of a filament. For example, the ratio of draw speed in forming a portion of the largest diameter to draw speed in forming a portion of the smallest diameter is preferably approximately 1:1.5 to 4.

Other preferable examples of an embodiment of a line of autohesion thread to be manufactured in the present invention include a line of autohesion thread having a core string comprising thermoplastic resin, in which plural filaments comprising a thermoplastic resin are placed so as to center the core string and the adjacent filaments are substantially completely fused. More specifically, a line of autohesion thread is included, in which plural filaments comprising thermoplastic resin are paralleled so as to surround the core string or plural filaments comprising thermoplastic resin are braided around core string, and then the adjacent filaments are substantially completely fused. In the embodiment, with regard to a filament comprising a thermoplastic resin, only a filament comprising one kind of thermoplastic resin may be used, or a combination of filaments comprising plural kinds of thermoplastic resins may be used; only a filament comprising one kind of thermoplastic resin is preferably used.

The manufacture of a line of autohesion thread in the above manner generally allows the manufactured line of thread to contain no fusing medium and adjacent filaments to be substantially fused together. The present invention provides a line of fusion thread containing plural filaments comprising a thermoplastic resin wherein the adjacent filaments are substantially fused, characterized in that the thickness of said line of thread is within an approximately ±10% range (preferably ±5%) of that of a line of thread containing filaments of the same thermoplastic resin wherein the number of the filaments is the same as said line of thread and the adjacent filaments are not fused; and the tensile strength of said line of thread is more than that of the line of unfused thread. According to the present invention, the thickness of the above-mentioned line of thread is ordinarily denoted as denier.

In a line of autohesion thread of the present invention, plural filaments composing a line of autohesion thread are substantially fused together. "To be substantially fused" means a state such that even though the manufactured line of thread is cut to hold a cut portion between the pad of a forefinger and the pad of a thumb in a hand of an adult male and then the line of thread is attempted to be crumpled while the largest manual pressure of an adult male is applied thereto, the line of thread is not frayed through visual observation. "Complete fusion" in the present invention means that in the case where the line of thread is cut in an optional place and the above-mentioned test is repeated 100 times, the line of thread is not frayed by 100%, and not fraying by 85% or more is regarded as pass in the present invention, preferably by 90% or more. Plural filaments of a line of autohesion thread may be filaments of a single kind or a mixture of filaments of two kinds or more.

In the present invention, a line of autohesion thread to be obtained in the above manner may further be coated with a synthetic resin. It is needless to say that such a line of thread is also included in a line of fusion thread of the present invention.

The synthetic resin (herein after also referred to as "coating resin") to be used for the above-mentioned coating in the present invention may employ publicly known resins, which can preferably adhere closely to a line of autohesion thread of the present invention. In particular, a resin which withstands long-term use outdoors and is superior in durability such as rubbing and bending fatigue is more preferable as the above-mentioned coating resin. In the case where the outer periphery of a line of autohesion thread, which is DYNEEMA, of the present invention is coated with a coating resin by extrusion coating to be detailed below, the coating resin preferably has a melt index of approximately 0.1 g/10 minutes or more, more preferably approximately 0.1 g/10 minutes to 1000 g/10 minutes. A coating resin having a melt index in the above-mentioned range is preferably used in order to coat without deteriorating tensile strength of a line of autohesion thread of the present invention as a core. Here, melt index of a resin is measured by a melt indexer (L-202, manufactured by Takara Kogyo Co., Ltd.) in a method in accordance with JIS K 7210 (1976) "Determination of the melt mass-flow rate (MFR) and the melt volume-flow rate (MVR) of thermoplastics".

Examples of the coating resin include polyolefin resins such as high-density polyethylene, polypropylene, ethylene-vinyl acetate copolymer, and a modified product thereof; polyamide resins such as nylon and copolyamide; acrylic resins or a copolymerized modified product thereof; polyurethane resins; polystyrene resins; vinyl acetate resins; polyvinyl chloride resins; and epoxy resins.

In the present invention, a resin containing metallic particles may be used as a coating resin. The inclusion of metallic particles is advantageous in that manufacturing a line of thread having an optional specific gravity, particularly a line of thread having a high specific gravity, can be performed irrespective of the specific gravity of the coating resin. The kind or content of metallic particles here used is preferably the same as the case where metallic particles are contained in a filament.

In the present invention, a method of coating the outer periphery of a line of autohesion thread of the present invention with a coating resin can adopt a publicly known method such as pressure extrusion coating. Among them, a method by pipe extrusion coating is appropriate. A method by pipe extrusion coating is such that a molten coating resin is extruded from an extruder and adhered closely to a preheated line of thread as a core under pressurized conditions, whereby adherence of a film becomes markedly superior. In addition, the coating resin may be applied by using publicly known means such as an applicator, a knife coater, a reverse-roll coater, a gravure coater, a flow coater, a rod coater and a brush, or a method in that a line of thread as a core is immersed in a tub storing coating resin in molten state or solution state and then pulled up, out of which line an excess quantity is squeezed, may be used.

On the occasion of coating with the above-mentioned coating resin, the shape of a line of autohesion thread of the present invention can be formed into a taper shape. A method of forming a taper shape may employ a publicly known method. For example, the number of revolutions of a measuring pump (a gear pump) put in an extruder is optionally fluctuated to change discharge quantity of the resin and further control the duration in the number of revolutions under each situation, so that a taper shape having respective lengths can be formed in intended thick portion, thin portion and taper portion. The shape of a taper portion can be changed by relative length of change-over time in a measuring pump from high-velocity revolution to low-velocity revolution or from low-velocity revolution to high-velocity revolution.

The coating of the above-mentioned line of autohesion thread with coating resin in this manner makes a line of autohesion thread further superior in drainability.

The use of a line of autohesion thread to be manufactured by a method of the present invention is not particularly limited, for example, which line can appropriately be used for fishing lines, particularly for various leisure and fishery, materials for fisheries such as a longline of tuna fishery, rope, gut, kite string, "weedeater" string, cords for various industrial materials such as cord for a blind, dial cord, cord for a portable phone strap, and extension cord, Western-style bowstring, musical instrument's string, string for safe lock, or suture for operation.

Example 1

Four pieces of DYNEEMA (registered trademark, manufactured by Toyobo. Co., Ltd.) 100 deniers were braided up by a braiding machine to manufacture braided yarn A. This braided yarn A was sent into a heating furnace heated to a temperature of 149° C. at a speed of 100 m/minute of a send-in roller and 40 m/minute of a wind-up roller to manufacture fused yarn B. This fused yarn B was sent again into a heating furnace heated to a temperature of 149° C. at a speed of 30 m/minute of a send-in roller and 40 m/minute of a wind-up roller to manufacture fused yarn C.

Tenacity (kg) and elongation (%) of the manufactured braided yarn A, fused yarn B and fused yarn C were measured by using a universal tester AUTOGRAPH AG-100kN1 (tradename, manufactured by Shimadzu Corporation). The results of measuring were shown in Table 1.

TABLE 1

| Yarn Quality Data | Denier | Tensile Tenacity (kg) | Tensile Strength (g/d) | Elongation (%) |
|---|---|---|---|---|
| Braided Yarn A | 414 | 6.21 | 23.1 | 6.82 |
| Fused Yarn B | 542 | 5.82 | 10.7 | 8.03 |
| Fused Yarn C | 400 | 9.38 | 23.4 | 4.75 |

Example 2

Eight pieces of nylon 6 multifilament yarn 210 deniers manufactured by Unitika Fibers Ltd. were braided up by a braiding machine to manufacture braided yarn A'. This braided yarn A' was sent into a heating furnace heated to a temperature of 220° C. at a speed of 5 m/minute of a send-in roller and 4 m/minute of a wind-up roller to manufacture fused yarn B'. This fused yarn B' was sent again into a heating furnace heated to a temperature of 220° C. at a speed of 4 m/minute of a send-in roller and 5.5 m/minute of a wind-up roller to manufacture fused yarn C'.

Tensile tenacity (kg), tensile strength (g/d) and elongation (%) of the manufactured braided yarn A', fused yarn B' and fused yarn C' were measured in the same manner as Example 1. The results of measuring were shown in Table 2.

TABLE 2

| Yarn Quality Data | Denier | Tensile Tenacity (kg) | Tensile Strength (g/d) | Elongation (%) |
|---|---|---|---|---|
| Braided Yarn A' | 1924 | 12.49 | 6.5 | 34.71 |
| Fused Yarn B' | 2386 | 8.32 | 3.5 | 58.10 |
| Fused Yarn C' | 1900 | 13.68 | 7.2 | 28.32 |

A line of thread of the present invention can be utilized for fishing lines for leisure and fishery, threads for fishery materials such as a longline of tuna fishery, and threads for rope, gut or kite string.

What is claimed is:

1. A method of manufacturing a line of fusion thread, wherein plural filaments comprising a thermoplastic resin are
   (a) paralleled,
   (b) paralleled and twisted,
   (c) paralleled and braided, or
   (d) paralleled, twisted and braided, subsequently drawn under heat at a draw ratio of less than 1.0 to substantially fuse the adjacent filaments, and thereafter drawn under heat at a draw ratio of more than 1.0,
   wherein the draw ratio is represented by the following formula:

a speed of a wind-up roller/a speed of a send-in roller.

2. The method of manufacturing a line of fusion thread according to claim 1, wherein the thermoplastic resin is a polyamide resin, a polyester resin, a fluororesin or a polyolefin resin.

3. The method of manufacturing a line of fusion thread according to claim 1, wherein the filaments comprising a thermoplastic resin are filaments having a tensile strength of 20 g/d or more.

4. The method of manufacturing a line of fusion thread according to claim 1, wherein a temperature for the drawing under heat at a draw ratio of less than 1.0 is higher than a melting point of the filaments comprising a thermoplastic resin.

5. The method of manufacturing a line of fusion thread according to claim 1, wherein an outer periphery of the thread is further coated with a synthetic resin after the heat drawing at a draw ratio of more than 1.0.

6. A method of manufacturing a line of fusion thread, wherein plural filaments comprising a thermoplastic resin are paralleled so as to surround a core string and optionally further twisted, or
   plural filaments comprising a thermoplastic resin are braided around a core string, and subsequently drawn under heat at a draw ratio of less than 1.0 to substantially fuse the adjacent filaments, and thereafter drawn under heat at a draw ratio of more than 1.0, wherein the draw ratio is represented by the following formula:

a speed of a wind-up roller/a speed of a send-in roller.

* * * * *